(12) United States Patent
Zhang et al.

(10) Patent No.: US 12,099,238 B2
(45) Date of Patent: Sep. 24, 2024

(54) DEVICE AND METHOD FOR SPLICING ARRAY OPTICAL FIBER WITH LARGE-SIZE QUARTZ END CAP

(71) Applicant: Shanghai Institute of Optics And Fine Mechanics, Chinese Academy of Sciences, Shanghai (CN)

(72) Inventors: Haibo Zhang, Shanghai (CN); Menghao Wu, Shanghai (CN); Bing He, Shanghai (CN); Yu Lei, Shanghai (CN); Jun Zhou, Shanghai (CN); Yunfeng Qi, Shanghai (CN); Zhijun Yuan, Shanghai (CN); Ren Ye, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 594 days.

(21) Appl. No.: 17/340,820

(22) Filed: Jun. 7, 2021

(65) Prior Publication Data
US 2022/0214499 A1 Jul. 7, 2022

(30) Foreign Application Priority Data
Jan. 4, 2021 (CN) .......................... 202110001757.2

(51) Int. Cl.
*G02B 6/255* (2006.01)
(52) U.S. Cl.
CPC ......... *G02B 6/2553* (2013.01); *G02B 6/2555* (2013.01)

(58) Field of Classification Search
CPC ... G02B 6/2551; G02B 6/2553; G02B 6/2555
See application file for complete search history.

(56) References Cited

FOREIGN PATENT DOCUMENTS

| CN | 109188609 A | * | 1/2019 | .......... G02B 6/2551 |
| JP | 2003043288 A | * | 2/2003 | |
| JP | 2005241822 A | * | 9/2005 | .......... B23K 26/032 |

OTHER PUBLICATIONS

JP-2005241822-A (Inoue) Sep. 8, 2005 (English language machine translation). [online] [retrieved Mar. 5, 2024]. Retrieved from: Espacenet. (Year: 2005).*

(Continued)

*Primary Examiner* — Erin Snelting
(74) *Attorney, Agent, or Firm* — Mei & Mark LLP; Manni Li

(57) ABSTRACT

A device for realizing the splicing of an array fiber and a large-size quartz end cap comprises a carbon dioxide laser, a light splitter, a light beam shaper, a high reflectivity mirror, an image detection module, an array fiber and a carrier thereof, a large-size quartz end cap and a carrier thereof, a stepping motor, a thermodetector, and a computer; a laser beam emitted by the carbon dioxide laser is divided into two light beams through a light splitter, after the two light beams respectively pass through the beam shaper and the high reflectivity mirror, two strip-shaped light spots with uniform power density are integrally formed to heat a splicing face of the large-size quartz end cap, a uniform temperature field of a target splicing area is achieved through indirect heating and heat conduction.

6 Claims, 3 Drawing Sheets

(56) References Cited

OTHER PUBLICATIONS

CN-109188609-A (Chen) Jan. 11, 2019 (English language machine translation). [online] [retrieved Mar. 5, 2024]. Retrieved from: Espacenet. (Year: 2019).*

JP-2003043288-A (Hirayama) Feb. 13, 2003 (English language machine translation). [online] [retrieved Mar. 5, 2024]. Retrieved from: Espacenet. (Year: 2003).*

Ye Zhou et al., "Laser homogenization system design and experimental research based on cylindrical microlens array," Laser And Infrared, 50(04): 486-492 (Apr. 2020).

* cited by examiner

DEVICE AND METHOD FOR SPLICING ARRAY OPTICAL FIBER WITH LARGE-SIZE QUARTZ END CAP

CROSS-REFERENCE TO RELATED APPLICATIONS

The subject application claims priority to Chinese Patent Application No. 202110001757.2 filed on Jan. 4, 2021, in China. The Chinese priority application is incorporated herein by reference.

TECHNICAL FIELD

The present invention relates to the field of splicing optical fiber end cap, and particularly, device and method for splicing an array optical fiber with a large-size quartz end cap.

BACKGROUND ART

The high-brightness fiber laser has wide application in industry, medical treatment, national defense, etc. There is a theoretical limit for the output power of single-channel single-mode fiber lasers, given the limitations of nonlinear effect, mode instability effect, material damage characteristics, etc. Spectral beam combining is an important technical way to achieve high power and high beam quality laser output. With a specific beam combining method, the output laser power is improved, and the output laser is guaranteed to have good beam quality. Spectral beam combining has the advantages of good output beam quality, requiring no sub-beam phase, simple and stable structure, and manifests irreplaceable important application value. Theoretically, Spectral beam combining can improve the laser output power by proportionally increasing the number of channels while maintaining the quality of the input laser beam to realize the calibration and amplification of the brightness of the synthesized beam. However, in the practical synthetic system, the beam quality of the synthesized light is worse than that of the single fiber input laser. That is mainly affected by the disturbance of the laser array, the aberration of the convertible lens, the thermal distortion of the diffraction grating and the line width of the array light source, and similar factors.

As the single-path optical fiber output head needs to be mechanically clamped and water-cooled in a spectral beam combining device, the interval between adjacent optical fibers cannot be reduced without limitation such that the spectral beam combining device cannot be compact and lightweight, thereby limiting the application of the high-brightness optical fiber laser on a mobile platform.

The array optical fiber end cap made by splicing an array optical fiber with a large-size quartz end cap helps to optimize the beam quality of the synthesized light of the spectrum synthetic system and realize the compactness and lightweight of the beam combining device. The array optical fiber end cap is the essential key component to couple a fiber laser array to a spectrum synthetic system and realize a compact and high-brightness laser light source.

SUMMARY OF THE PRESENT INVENTION

In order to overcome the defects of the existing technology, the present invention provides a device and method for splicing an array fiber with a large-size quartz end cap.

The present invention achieves the above technical purpose by the following technical means. The present invention provides a device for splicing an array fiber with a large-size quartz end cap, comprising a light source shaping module for forming two parallel strip-shaped light spots with same light spot size, power density, and uniform power density on an end cap splicing face of a large-size quartz end cap (8) to be spliced, while for heating the end cap splicing face to form a uniform temperature field at a splicing area that is a projection area of an array fiber (14) on the end cap splicing face; and an image detection module for realizing alignment and interval measurement of the array fiber (14) and the large-size quartz end cap (8) and checking whether fiber end faces of the array fiber (14) are flush or not.

In the device for splicing an array fiber with a large-size quartz end cap of the present invention, the light source shaping module comprises a carbon dioxide laser (1), a beam splitter (2), a first light beam shaper (3), a first high reflectivity mirror (5), a second light beam shaper (12), and a second high reflectivity mirror (13). The carbon dioxide laser (1) generates a collimated carbon dioxide single-mode laser and heats the splicing face of the end cap; the beam splitter (2) is a beam splitter with a transmission/reflection ratio of 50/50 to split a laser output by the carbon dioxide laser (1) into two identical lasers; the first light beam shaper (3) and the second light beam shaper (12) are both composed of two cylindrical microlens arrays and one spherical Fourier lens, materials of the first light beam shaper (3) and the second light beam shaper (12) are both ZnSe, and two split laser round light spots are shaped into strip-shaped light spots with uniform power density by the first light beam shaper (3) and the second light beam shaper (12), respectively; and the first high reflectivity mirror (5) and the second high reflectivity mirror (13) change a direction of a laser beam.

In the present invention, the image detection module further comprises a first CCD camera (6), and a second CCD camera (9). The first and second CCD cameras are placed perpendicular to each other, and both imaging directions of the first CCD camera (6) and the second CCD camera (9) are perpendicular to a fiber optical axis.

In the present invention, the device for splicing an array fiber with a large-size quartz end cap is characterized by further comprising an end cap carrier which can be divided into a two-dimensional adjustable mirror bracket for clamping and fixing the end cap and a translation stage base, and is used for clamping and fixing the large-size quartz end cap and realizing five-dimensional displacement adjustment of the large-size quartz end cap, namely the two-dimensional displacement adjustment of the pitching and azimuth of the two-dimensional adjustable mirror bracket and the three-dimensional displacement adjustment of the translation stage base;

an array fiber carrier used for clamping and fixing the array fiber and realizing five-dimensional displacement adjustment of the array fiber, and can be divided into three parts, namely a pressing plate holder, a two-dimensional adjustable mirror bracket and a translation stage base, wherein by customizing the number of layers and the V-shaped groove array of the pressing plate holder as required, the array fiber is clamped and fixed, and the positioning precision of the pressing plate holder for fixing the fiber can reach ±1 micron such that the fibers have high parallelism therebetween, and the array fiber is arranged in parallel;

a stepping motor mounted and fixed on the array fiber carrier and used for realizing the linear translation of the array fiber; and a computer connected with the thermodetector, the first CCD camera, the second CCD camera, and the stepping motor respectively, and configured to control the thermodetector to realize temperature monitoring, process images collected by the first CCD camera and the second CCD camera, and control the stepping motor to perform linear displacement.

In the present invention, the array fiber is composed of a plurality of fibers, the interval Δx of each adjacent fiber is arbitrarily variable, and the sizes of the adjacent fibers can be different from each other.

In the present invention, the array fiber is single-column or two-column. In the splicing area, namely the projection area of the array fiber on the splicing face of the end cap of the large-size quartz end cap, the distance from the two strip-shaped light spots to the array fiber projection is equal, and the distance can be larger than the width of the strip-shaped light spots.

In the present invention, when the number of columns of the array fiber is two, the array fibers should be symmetrically placed about the center of the end cap.

According to one embodiment of the present invention, a light beam shaper composed of two cylindrical microlens arrays (MLA1 and MLA2) and one spherical Fourier lens (FL), wherein the two cylindrical microlens arrays and the spherical Fourier lens are both made of ZnSe, is used for shaping a circular light spot after beam splitting so as to realize the flat-top homogenization of a collimated Gaussian light beam and obtain a strip-shaped light spot with uniform power distribution. The light spot length L on the focal plane of the spherical Fourier lens is as follows:

$$L = \frac{f_{FL}}{f_{MLA1} \cdot f_{MLA2}} (f_{MLA1} - f_{MLA2} + d) \cdot P_{MLA};$$

where $f_{FL}$ is the focal length of the lens (FL), $f_{MLA1}$ and $f_{MLA2}$ are the focal lengths of the two cylindrical microlens arrays respectively, the MLA2 cylindrical microlens array is positioned between two optical elements, the interval between the two cylindrical microlens arrays is d, and the lens units are identical in size and are both $P_{MLA}$; under the condition that the optical element is determined, strip-shaped light spots with different lengths can be realized by changing the size of d (See, Ye Zhou et al., "Laser homogenization system design and experimental research based on cylindrical microlens array," Laser And Infrared, 2020, 50(04): 486-492). The splicing face of the end cap is heated by two parallel strip-shaped light spots with uniform power distribution, the temperature distribution of the area between two light spots is approximately one-dimensional gradient distribution, and the temperature distribution is symmetrical about the center of the end cap. In the diameter range of the fiber cladding, the temperature difference between the center and the edge of the splicing area is small, and the influence on the splicing quality is little. It can be considered that a uniform temperature field is formed at the splicing area, which is beneficial to the splicing of the array fiber and the large-size quartz end cap.

According to one embodiment of the present invention, the splicing method comprises the following steps:

(1) clamping and fixing an array fiber to be spliced by using a pressing plate holder customized as required such that the array fiber is arranged in parallel, and the pressing plate holder can be mounted on an array fiber carrier in a magnetic attraction manner; clamping and fixing a large-size quartz end cap to be spliced by using an end cap carrier;

(2) controlling a first CCD camera and a second CCD camera by a computer to image the array fiber and the large-size quartz end cap, checking whether fiber end faces of the array fiber are flush or not, completing the alignment and interval measurement of the array fiber and the large-size quartz end cap by adjusting the array fiber carrier and the end cap carrier, and actuating a stepping motor to drive the array fiber to translate such that the interval between the array fiber and the large-size quartz end cap is appropriate (about 100 microns), wherein the interval should be kept unchanged in each splicing experiment;

(3) turning on a carbon dioxide laser to generate a collimated laser beam with appropriate power, the collimated laser beam being split into two identical laser beams after passing through a beam splitter, and the two identical laser beams becoming two strip-shaped light spots with the uniform power density and appropriate interval after respectively passing through the first beam shaper, the first high reflectivity mirror and the second high reflectivity mirror and the second beam shaper, wherein the optical lengths of two laser beams after passing through the beam shaper are required to be consistent to heat the splicing face of the end cap and form a uniform temperature field at the splicing area, and the interval between the strip-shaped light spot and the array fiber should be larger than the width of the line light spot;

(4) monitoring the real-time temperature of the splicing area by using a thermodetector, setting the stepping motor at an appropriate translation speed and distance after a preset temperature is reached, and actuating the stepping motor to realize the accurate linear translation of the array fiber, wherein the difference between the translation distance of the stepping motor and the interval between the array fiber and the large-size quartz end cap is the splicing length;

(5) turning off the carbon dioxide laser after the movement is completed, namely completing one-time splicing of the array fiber and the large-size quartz end cap; and (6) due to the off-axis structure of the optical axis of an irradiation heating beam, and the array fiber, it being possible that the spliced array fiber end cap is heated again such that welding stress can be released and splicing quality is improved.

The present invention has the following beneficial effects. The splicing method of the present invention has the technical advantages that:

(1) according to the fiber array pre-arrangement technology, a customized pressing plate holder as required can enable the optical axis of the array fiber to have high parallelism, namely the array fiber is arranged in parallel;

(2) according to the double-beam coupling uniform heating technology, two parallel strip-shaped light spots with uniform power density are used for heating the non-target area, the splicing area is indirectly heated in a heat conductive manner, the uniform temperature field of the splicing area is realized, the splicing of the array fiber end cap is facilitated, the spliced array fiber end cap can be heated again, the welding stress can be released, and the splicing quality can be improved;

(3) as the scale expansibility of the fiber array is strong, the end cap is heated by the strip-shaped light spot after beam shaping to realize the uniform temperature field in the splicing area, the interval Δx of adjacent fibers can be arbitrarily changed, the sizes of the adjacent fibers can be different, the number of columns can be the splicing of two columns of the array fibers and the large-size quartz end cap, and since the scale expansibility of the array fiber is strong, when the range of the uniform temperature field is expanded, the scale of the array fiber to be spliced can be expanded;

the reference can be provided for the optimal design of the laser array part in the high-brightness spectrum synthetic system; compared with the fact that a plurality of fiber end caps is arranged in a linear array to realize laser array output, the array fiber end cap formed by splicing the array fiber and the large-size quartz end cap has the advantages of higher integration level and flexible and variable array fiber.

BRIEF DESCRIPTION OF THE DRAWINGS

FIG. 3A shows a single-column array fiber, and FIG. 3B shows a two-column array fiber.

Figure 1:
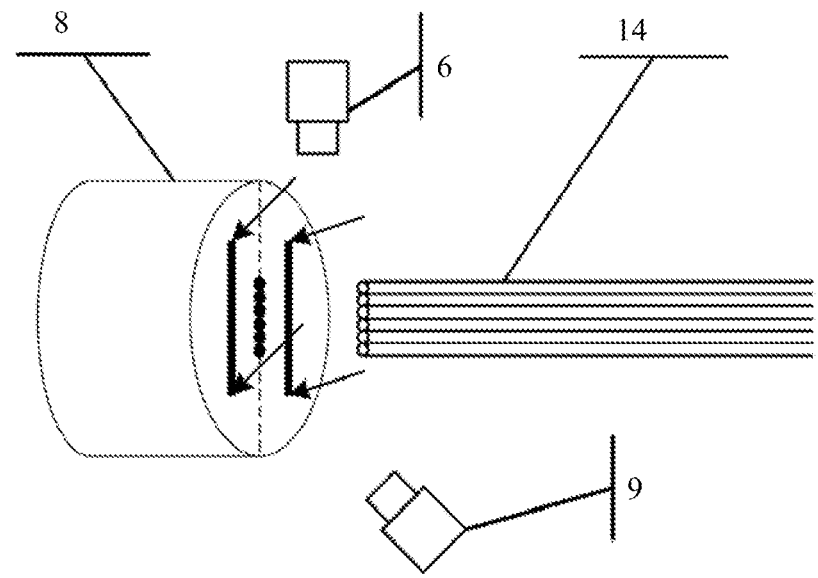
FIG. 1 shows the structure where an array fiber is spliced with a large-sized quartz end cap according to the present invention.
Figure 2:
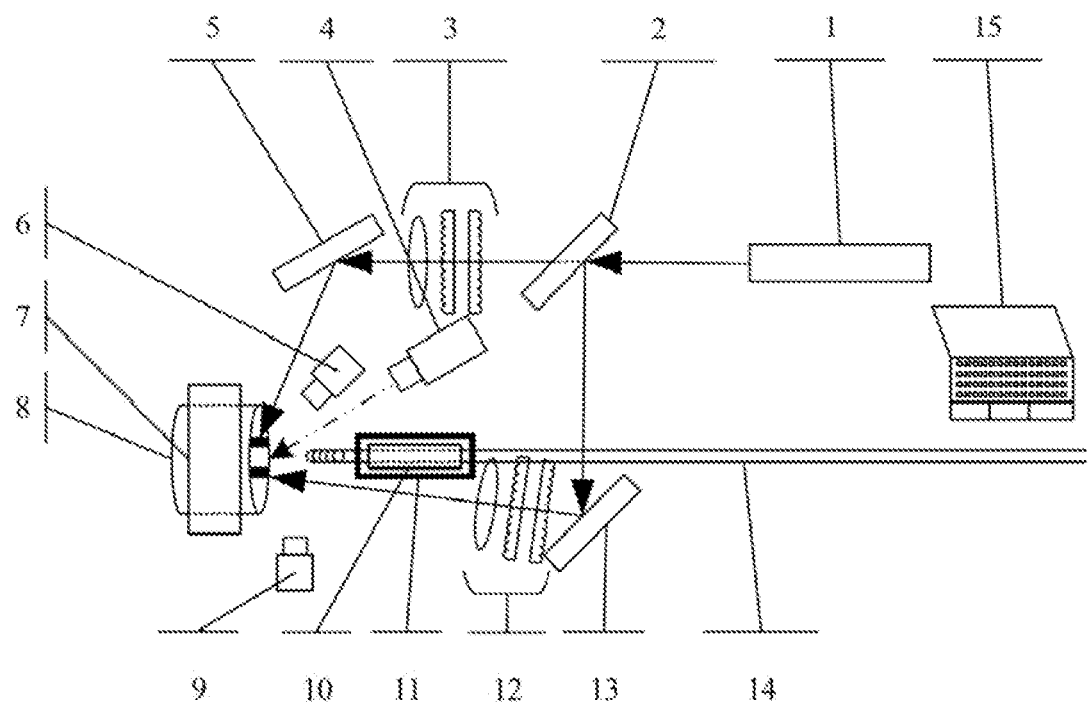
FIG. 2 shows the light path where an array fiber is spliced with a large-size quartz end cap according to one embodiment of the present invention.
Figures 3A, 3B:
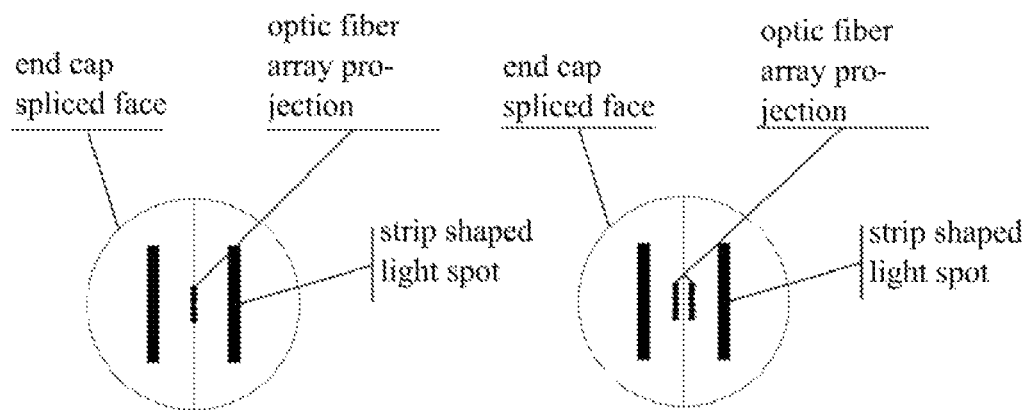
FIGS. 3A and 3B show the front views of the spliced face of an end cap according to one embodiment of the present invention, where
Figure 4:
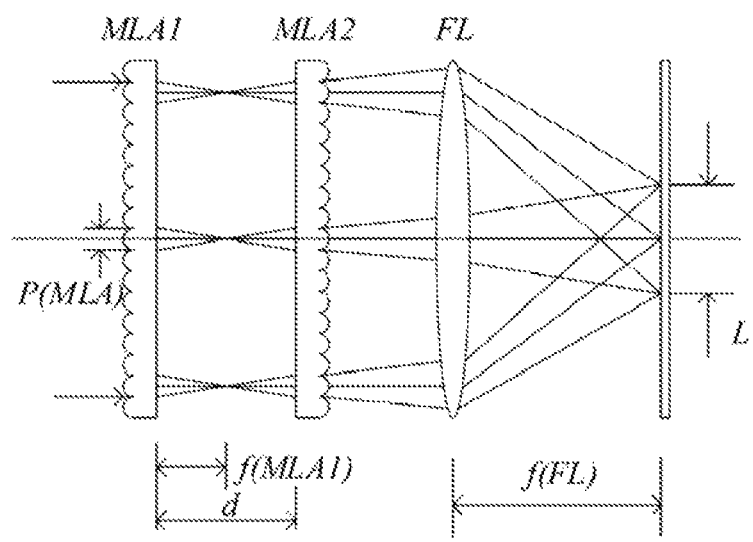
FIG. 4 shows the principle of a beam shaper in the present invention.

Reference numerals in the figures refer to the following structures: 1—carbon dioxide laser; 2—beam splitter; 3—first beam shaper; 4—thermodetector; 5—first high reflectivity mirror; 6—first CCD camera; 7—end cap carrier; 8—large-size quartz end cap; 9—second CCD camera; 10—array fiber carrier; 11—stepping motor; 12—second beam shaper; 13—second high reflectivity mirror; 14—array fiber 14; and 15—computer.

DETAILED DESCRIPTION OF THE PRESENT INVENTION

The present invention is further explained in the following detailed embodiments with reference to the accompanying drawings. In the following description, many specific details are set forth in order to provide a thorough understanding of the present invention. However, the present invention can be implemented in many other ways different from those described herein, and those skilled in the art can make similar improvements without departing from the connotation of the present invention. Therefore, the present invention is not limited by the specific implementation disclosed below.

The device for realizing the splicing of the array fiber and the large-size quartz end cap according to one embodiment of the present invention is shown in FIGS. 1 to 3B. The device for realizing the splicing of the array fiber and the large-size quartz end cap according to the embodiment of the present invention comprises a carbon dioxide laser 1, a beam splitter 2, a first beam shaper 3, a thermodetector 4, a first high reflectivity mirror 5, a first CCD camera 6, an end cap carrier 7, a large-size quartz end cap 8, a second CCD camera 9, an array fiber carrier 10, a stepping motor 11, a second beam shaper 12, a second high reflectivity mirror 13, an array fiber 14, and a computer 15.

Specifically, the method for realizing the splicing of the array fiber and the large-size quartz end cap of the present invention comprises the following steps.

Figure 5:
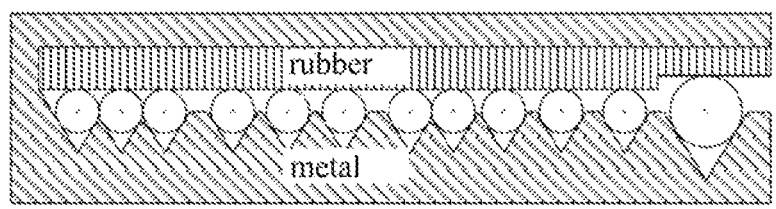
FIG. 5 shows a pressing plate holder for an array fiber in the present invention.
Figure 6:
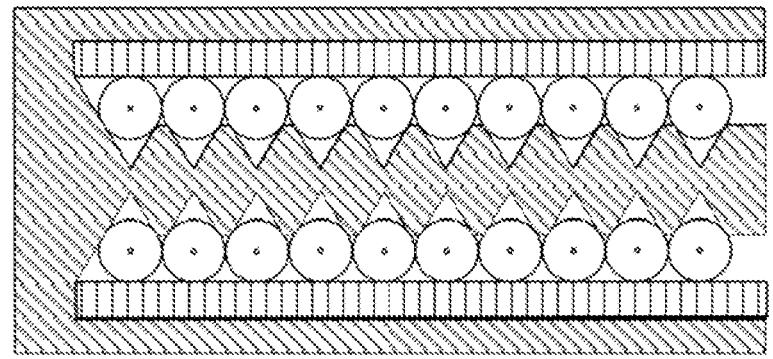
FIG. 6 shows a pressing plate holder for an array fiber with two columns in the present invention.

(1) The array fiber 14 to be spliced is clamped and fixed by using a pressing plate holder customized as required (the interval Δx between adjacent fibers is arbitrarily variable, the sizes of the adjacent fibers can be different from each other as shown in FIG. 5, and the number of columns can be two columns as shown in FIG. 6), such that the array fibers 14 are arranged in parallel, and the pressing plate holder can be mounted on the array fiber carrier 10 in a magnetic attraction manner; a large-size quartz end cap 8 to be spliced is clamped and fixed through an end cap carrier 7.

(2) CCD camera can use a telecentric lens, and needs an appropriate field of view and an illumination light source; the first CCD camera 6 and the second CCD camera 9 are controlled by using a computer 15 to image the array fiber 14 and the large-size quartz end cap 8, whether the fiber end face of the array fiber 14 is flush or not is checked, the array fiber carrier 10 and the end cap carrier 7 are then adjusted to complete the alignment and interval measurement of the array fiber 14 and the large-size quartz end cap 8, and the stepping motor 11 is then driven such that the interval therebetween is appropriate (to avoid errors caused by the reciprocating motion of the stepping motor, an absolute displacement command of the stepping motor can be adopted to control the stepping motor; the appropriate interval should be kept unchanged in a series of splicing experiments).

(3) The carbon dioxide laser 1 is turned on to generate a collimated laser beam with appropriate power, the collimated laser beam is divided into two identical laser beams after passing through the beam splitter 2, and the two identical laser beams respectively pass through the first beam shaper 3, the first high reflectivity mirror 5, the second high reflectivity mirror 13 and the second beam shaper 12 to become two strip-shaped light spots with appropriate interval and uniform power density, wherein the optical lengths of the two laser beams after passing through the cylindrical lens are required to be kept consistent, the two strip-shaped light spots are used for heating the splicing face of the end cap, a uniform temperature field is formed at a splicing area, and the maximum number of the splicing fibers of the single-column array fiber is $N_{MAX}=L/D$, where L is the length of the strip-shaped light spot, and D is the diameter of the fiber.

(4) A thermodetector 4 is used to monitor the real-time temperature of the splicing area, the stepping motor is set at an appropriate translation speed and distance after a preset temperature is reached (the translation speed and distance need to be set correspondingly according to different fiber sizes), the stepping motor is actuated to drive the array fiber 14 to perform linear translation, and the difference between the translation distance of the stepping motor 11 and the interval between the array fiber 14 and the large-size quartz end cap 8 is the splicing length.

(5) The carbon dioxide laser 1 is turned off after the movement is completed, namely one-time splicing of the array fiber 14 and the large-size quartz end cap (8) is completed.

(6) Due to the off-axis structure of the optical axis of the irradiation heating beam and the array fiber 14, the spliced array fiber end cap can be heated again such that the welding stress can be released, and the splicing quality is improved.

According to one embodiment of the present invention, the size of the fiber to be spliced is set to be 20/250 microns, the array fiber is single-column, and the center wavelength of the pulsed laser output by the carbon dioxide laser is 10.6 microns with an appropriate output laser power and appropriate line light spot interval length such that the interval between the array fiber and the quartz end cap is 100 microns. The stepping motor is actuated to translate by 130 microns, the translation speed is 75 microns per second, the stepping motor is actuated to drive the array fiber to perform accurate linear translation when the temperature of the splicing area measured by the thermodetector is about 1700° C. after the laser heating is performed for an appropriate time, and the laser is turned off after the translation is completed to complete one-time splicing of the array fiber and the large-size quartz end cap.

In another embodiment of the present invention, one light beam shaping lens group is placed behind a carbon dioxide laser. The lens group can shape a collimated carbon dioxide laser beam into a collimated strip-shaped light spot with uniform power density to replace a light beam shaper, thereby simplifying the debugging steps of an experimental device and a splicing experiment.

The present invention provides the device for realizing the splicing of an array fiber and a large-size quartz end cap comprises a carbon dioxide laser, a light splitter, a light beam shaper, a high reflectivity mirror, an image detection module, an array fiber and a carrier thereof, a large-size quartz end cap and a carrier thereof, a stepping motor, a thermodetector, and a computer; a laser beam emitted by the carbon dioxide laser is divided into two light beams through a light splitter, after the two light beams respectively pass through the beam shaper and the high reflectivity mirror, two strip-shaped light spots with uniform power density are integrally formed to heat a splicing face of the large-size quartz end cap, a uniform temperature field of a target splicing area is achieved through indirect heating and heat conduction, and when the temperature of the splicing area reaches a preset temperature, the stepping motor is actuated to enable the array fiber to translate to the splicing area at a uniform speed to be spliced and superposed with the end cap, thereby realizing one-time splicing of the array fiber. The array fiber end cap made by splicing an array fiber with a large-size quartz end cap helps to optimize the beam quality of the synthesized light of the spectrum synthetic system and realize the compactness and lightweight of the beam combining device.

The present invention is not limited to the embodiments described, and any obvious modification, substitution, or variation of the substance of the present invention is within the scope of the present invention.

We claim:

1. A device for splicing an array fiber with a quartz end cap, comprising a light source shaping module for forming two parallel strip-shaped light spots with same light spot size, power density, and uniform power density on an end cap splicing face of a quartz end cap (8) to be spliced and for heating the end cap splicing face to form a uniform temperature field at a splicing area that is a projection area of an array fiber (14) on the end cap splicing face; and an image detection module for realizing alignment and interval measurement of the array fiber (14) and the quartz end cap (8) and checking whether fiber end faces of the array fiber (14) are flush or not.

2. The device for splicing an array fiber with a quartz end cap according to claim 1, wherein the light source shaping module comprises a carbon dioxide laser (1),
a beam splitter (2),
a first light beam shaper (3),
a first high reflectivity mirror (5),
a second light beam shaper (12), and
a second high reflectivity mirror (13);
wherein the carbon dioxide laser (1) generates a collimated carbon dioxide single-mode laser beam and heats the splicing face of the end cap;
the beam splitter (2) is a beam splitter with a transmission/reflection ratio of 50/50 to split a laser output by the carbon dioxide laser (1) into two identical lasers;
the first light beam shaper (3) and the second light beam shaper (12) are both composed of two cylindrical microlens arrays and one spherical Fourier lens, materials of the first light beam shaper (3) and the second light beam shaper (12) are both ZnSe, and two split laser round light spots are shaped into strip-shaped light spots with uniform power density by the first light beam shaper (3) and the second light beam shaper (12), respectively;
the first high reflectivity mirror (5) and the second high reflectivity mirror (13) change a direction of a laser beam; and
the image detection module further comprises:
a first CCD camera (6), and
a second CCD camera (9),
wherein the first and second CCD cameras are placed perpendicular to each other, and both imaging directions of the first CCD camera (6) and the second CCD camera (9) are perpendicular to a fiber optical axis.

3. The device for splicing an array fiber with a quartz end cap according to claim 2, further comprising a thermodetector (4) for monitoring temperature of the splicing face of the end cap,
an end cap carrier (7) for clamping the quartz end cap (8) and realizing five-dimensional displacement adjustment of the quartz end cap (8),
an array fiber carrier (10) for clamping the array fiber (14) to enable fibers to be arranged in parallel and realize five-dimensional displacement adjustment thereof,
a stepping motor (11) connected with the array fiber carrier (10) for realizing linear translation of the array fiber (14), and
a computer (15) connected with the thermodetector (4), the first CCD camera (6), the second CCD camera (9) and the stepping motor (11), respectively, and configured to control the thermodetector (4) to realize temperature monitoring, process images collected by the first CCD camera (6) and the second CCD camera (9), and control the stepping motor (11) to perform linear displacement.

4. The device for splicing an array fiber with a quartz end cap according to claim 1, wherein the array fiber (14) is composed of a plurality of fibers, the interval $\Delta x$ of each adjacent fiber is arbitrarily variable, and sizes of the adjacent fibers can be different from each other.

5. The device for splicing an array fiber with a quartz end cap according to claim 4, wherein the array fiber (14) is single-column or two-column.

6. A method for splicing an array fiber with a quartz end cap using the device as described in claim 3, comprising
  (1) clamping and fixing an array fiber (14) to be spliced by the array fiber carrier (10) such that the array fiber (14) is arranged in parallel; clamping and fixing a quartz end cap (8) to be spliced by the end cap carrier (7);
  (2) controlling the first CCD camera (6) and the second CCD camera (9) by a computer (15) to image the array fiber (14) and the quartz end cap (8), and checking whether the fiber end faces of the array fiber (14) are flush or not; aligning and measuring an interval between the array fiber (14) and the quartz end cap (8) by adjusting the array fiber carrier (10) and the end cap carrier (7);
  (3) turning on the carbon dioxide laser (1) to generate the collimated carbon dioxide single-mode laser beam, the collimated carbon dioxide single-mode laser beam being split into two identical laser beams after passing through the beam splitter (2), and the two identical laser beams becoming two strip-shaped light spots with uniform power density after respectively passing through the first beam shaper (3), the first high reflectivity mirror (5) and the second high reflectivity mirror (13) and the second beam shaper (12) to heat the splicing face of the end cap and form a uniform temperature field at the splicing area;
  (4) monitoring real-time temperature of the splicing area by the thermodetector (4), setting the stepping motor (11) at an appropriate translation speed and distance after a preset temperature is reached, and actuating the stepping motor (11) to realize accurate linear translation of the array fiber (14);
  (5) turning off the carbon dioxide laser (1) after completing a movement of one-time splicing of the array fiber (14) and the quartz end cap (8); and
  (6) optionally heating the spliced array fiber end cap again to release welding stress and improve splicing quality.

* * * * *